(12) United States Patent  
Tanaka et al.

(10) Patent No.: US 7,712,810 B2
(45) Date of Patent: May 11, 2010

(54) INNER MIRROR ATTACHMENT STRUCTURE

(75) Inventors: Yoshito Tanaka, Nagano (JP); Akira Fukai, Shimada (JP)

(73) Assignee: Murakami Corporation, Shizuoka-shi (JP)

( * ) Notice: Subject to any disclaimer, the term of this patent is extended or adjusted under 35 U.S.C. 154(b) by 0 days.

(21) Appl. No.: 12/183,626

(22) Filed: Jul. 31, 2008

(65) Prior Publication Data

US 2009/0096235 A1 Apr. 16, 2009

(30) Foreign Application Priority Data

Oct. 12, 2007 (JP) ............................ P2007-266846

(51) Int. Cl.
*B60R 1/04* (2006.01)
(52) U.S. Cl. ..................................... 296/1.11
(58) Field of Classification Search ................ 296/1.11; 248/475.1, 476, 479–481, 221.11, 222.11, 248/223.31, 224.51, 224.61, 224.8, 548–549; 359/871, 872
See application file for complete search history.

(56) References Cited

U.S. PATENT DOCUMENTS

| 4,632,348 A | 12/1986 | Keesling et al. |
| 4,668,059 A | 5/1987 | Ohyama |
| 5,330,149 A | 7/1994 | Haan et al. |
| 5,377,948 A | 1/1995 | Suman et al. |
| 5,377,949 A | 1/1995 | Haan et al. |
| 5,820,097 A | 10/1998 | Spooner |
| 5,931,440 A | 8/1999 | Miller |
| 2007/0228247 A1 | 10/2007 | Tanaka et al. |

FOREIGN PATENT DOCUMENTS

| EP | 1 524 158 A1 | 4/2005 |
| JP | 6-507364 | 8/1994 |
| JP | 2003-118486 | 4/2003 |
| WO | WO 93/16900 | 9/1993 |
| WO | WO 03/041999 A1 | 5/2003 |

*Primary Examiner*—H Gutman
(74) *Attorney, Agent, or Firm*—Oblon, Spivak, McClelland, Maier & Neustadt, L.L.P.

(57) ABSTRACT

To improve a force by which a base holds an inner mirror, a base 4 keeping a base inner 6 for holding an inner mirror 2 is constituted by a first base 30 bonded to a front window 3 and a second base 40 clasped by the base inner 6; the second base 40 comprises a recessed mating part 43 where the first base 30 is fitted, and wider parts 41*a*, 41*b* abutting against side faces 33*a*, 33*b* of the first base 30 and extending outward from the side faces 33*a*, 33*b* of the first base 30; when the first base 30 is fitted into the mating part 43 of the second base 40, the mating width of the base 4 mating with the base inner 46 can be expanded by the width of the wider parts 41*a*, 41*b* of the second base 40, whereby the force by which the base 4 holds the inner mirror 2 can be improved even if the first base 30 is commoditized.

8 Claims, 12 Drawing Sheets

Fig.4
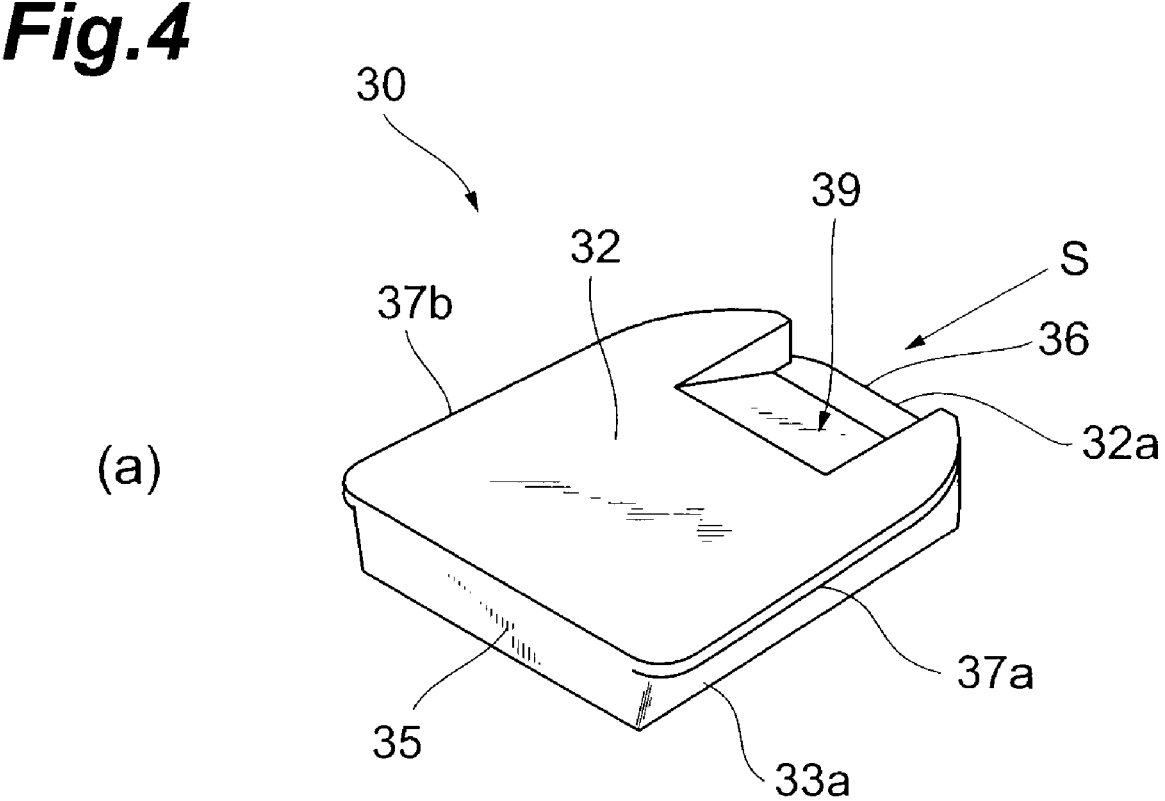
(a)
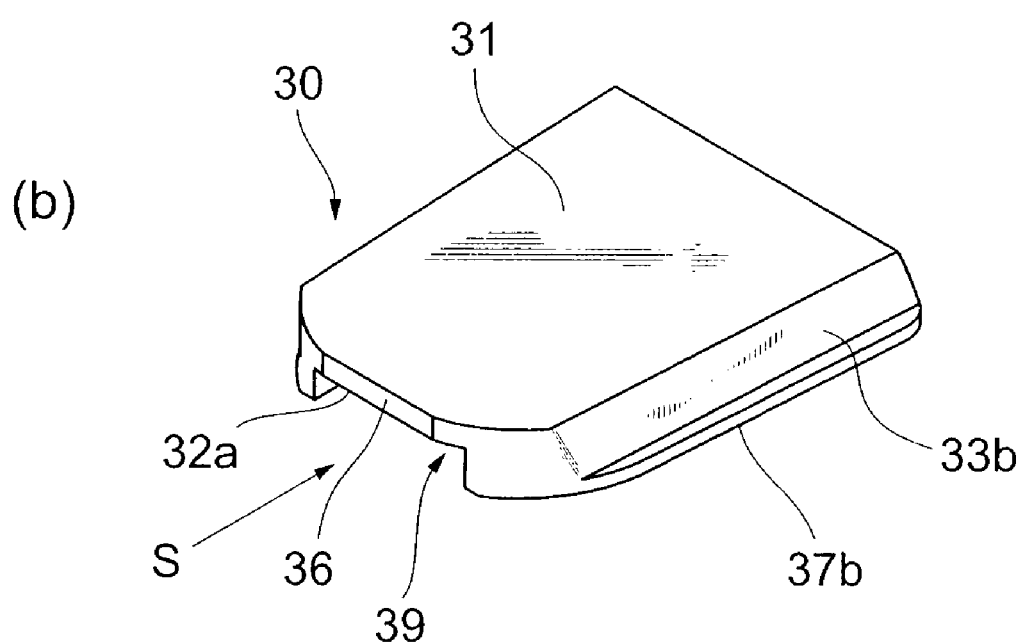
(b)

Fig.5
(a)
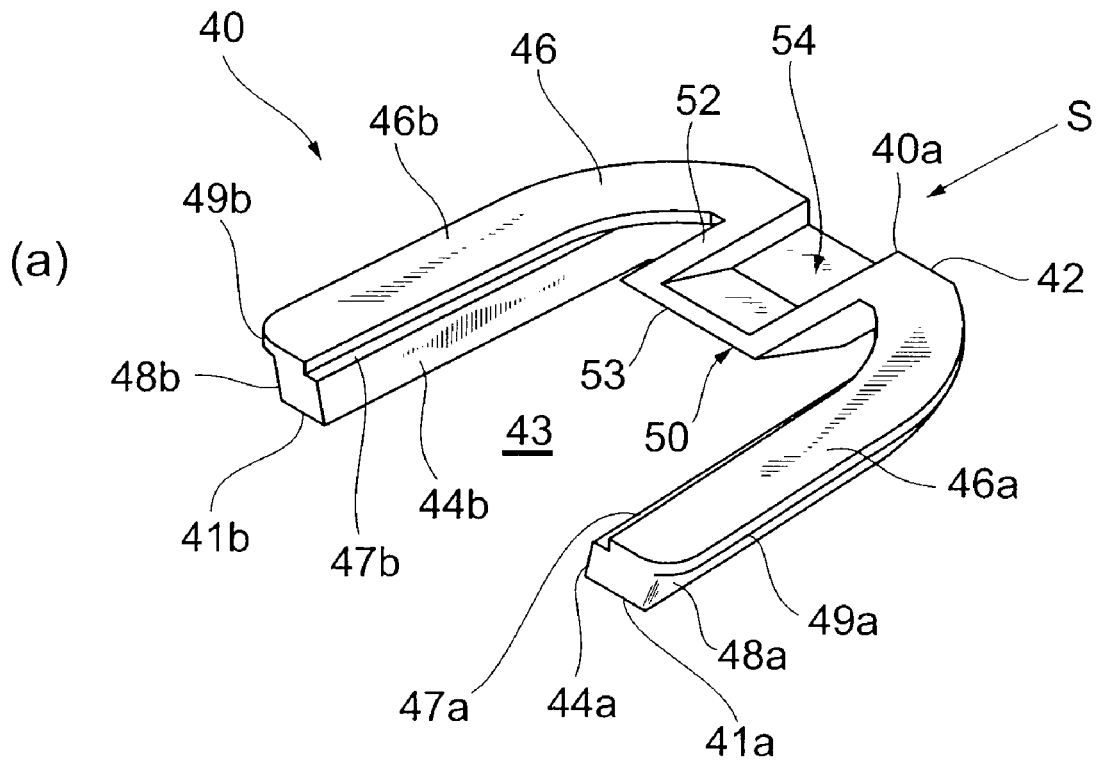
(b)
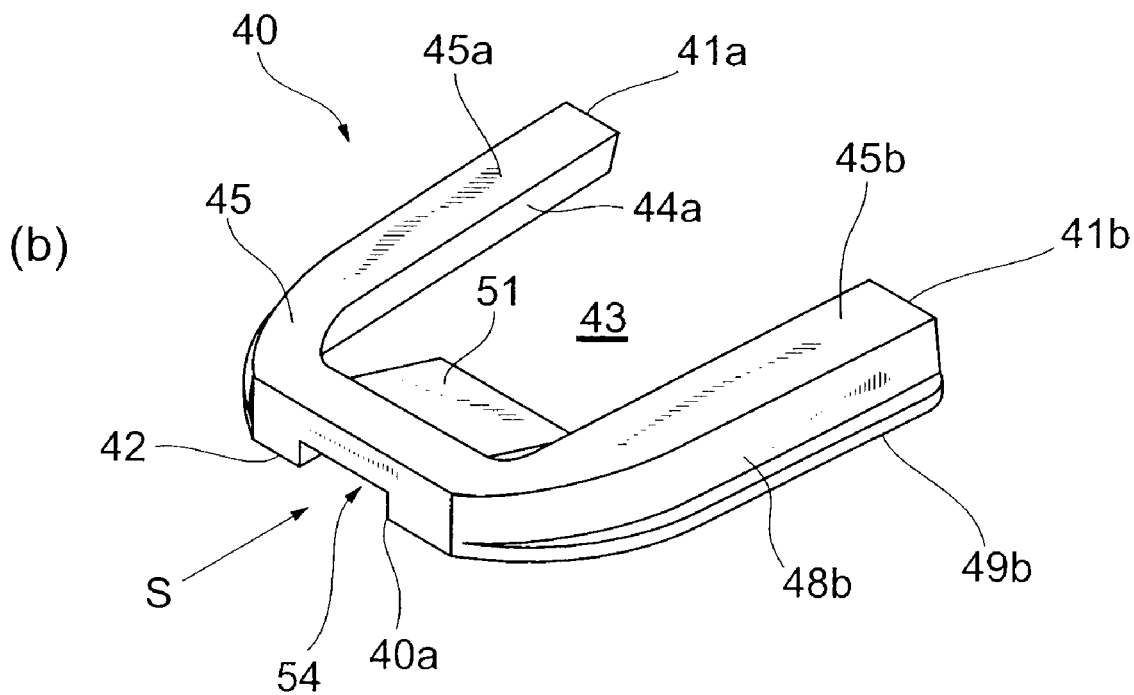

INNER MIRROR ATTACHMENT STRUCTURE

BACKGROUND OF THE INVENTION

1. Field of the Invention

The present invention relates to an inner mirror attachment structure for attaching an inner mirror to a front window through a base bonded to the front window.

2. Related Background Art

Conventionally known as a technique in such a field is an inner mirror attachment structure disclosed in Patent Document 1. This inner mirror attachment structure is constructed by a planar base bonded to the inner surface of a front window, and a base inner which is arranged at a base part of a stay for holding the inner mirror and clasps the base. The base inner is fitted to the base along the front window, and the opposing side faces of the base are clasped by the base inner, so that the base inner is mounted to the base, whereby the inner mirror is attached to the front window.

The base used as being bonded to the front window has been commoditized so as to be compatible among various inner mirrors. As the commoditized base, one having a small size has been employed so that the smallest inner mirror is mountable.

[Patent Document 1] Published International Patent Application WO 03/041999 pamphlet

SUMMARY OF THE INVENTION

As vehicles have recently been diversifying their functions, inner mirrors have been mounted with accessories such as cameras, thereby increasing their weight. Since the bases have been commoditized, however, there have been cases where the base clasping width of the base inner becomes narrower per weight of the inner mirror in the conventional inner mirror attachment structure, thereby making it harder for the base to fully support the inner mirror. Because of such a decrease in the holding force, chatter vibrations and the like have occurred between the base and the base inner when the vehicle body vibrates.

It is an object of the present invention to provide an inner mirror attachment structure which can improve the force by which the base holds the inner mirror.

The present invention provides an inner mirror attachment structure for attaching an inner mirror to a front window by fitting a base inner for holding the inner mirror to a planar base bonded to the front window; the base comprising a first base having a rear face bonded to the front window, and a second base having a recessed mating part where the first base is fitted and a wider part abutting against a side face of the first base and extending outward from the side face of the first base.

When the first base mates with the mating part of the second base in this inner mirror attachment structure, the first and second bases are integrated, so as to construct one base, while the base inner mates with the wider part of the second base. Since the mating width of the base mating with the base inner can be expanded by the width of the wider part of the second base as such, the force by which the base holds the inner mirror can be improved even when the first base is commoditized. If the mating structure between the base inner and the base is altered, only the second base will be required to change its form, while leaving the first base commoditized. This can increase the degree of freedom in designing the mating structure between the base inner and the base.

It will be preferred in this case if the first base has a first flange part projecting along a front face from the side face, while a wall forming the mating part in the second base is formed with a first groove part where the first flange part is fitted. When the first flange part of the first base is fitted into the first groove part of the second base in this inner mirror attachment structure, the second base is restrained from moving away from the front window, since the wall face forming the first groove part abuts against the first flange part. This can reliably prevent the second base from dropping out of the first base.

Preferably, the front face of the first base is formed with a first guide groove extending inward from an end part, the second base has a tongue fitted into the first guide groove, and the tongue projects toward the mating part. When the tongue of the second base is fitted into the first guide groove of the first base in this inner mirror attachment structure, the second base is restrained from moving toward the front window, since the tongue abuts against the groove bottom forming the first guide groove. The second base thus holds the first base between the tongue and the wall face forming the first groove part, thereby making it possible to keep the second base from jolting against the first base and improve the fastening force between the first and second bases.

Preferably, the first base has a second flange part projecting along the front face from a wall face forming the first guide groove, while a side face of the tongue of the second base is formed with a second groove part where the second flange part is fitted. When the second flange part of the first base is fitted into the second groove part of the tongue of the second base in this inner mirror attachment structure, the second base is restrained from moving toward the front window, since the wall face forming the second groove part abuts against the second flange part. Thus, the second base holds the first base with the tongue not only by the wall face forming the first groove part but also by the wall face forming the second groove part, thereby making it possible to further keep the second base from jolting against the first base and further improve the fastening force between the first and second bases.

Preferably, the base inner has a protrusion projecting toward a base accommodation space where the base is inserted and accommodated, while a front face of the tongue of the second base is formed with a second guide groove extending along the first guide groove from an end part, such that the protrusion is introduced into the second guide groove when the base is inserted into the base accommodation space. When the protrusion is introduced into the second guide groove at the time of inserting the base into the base accommodation space in this inner mirror attachment structure, the guide groove guides the protrusion, whereby the base inner is allowed to advance along the first guide groove. This can smoothly mate the base inner with the second base, thereby improving the workability.

The present invention can improve the force by which the base holds the inner mirror.

BRIEF DESCRIPTION OF THE DRAWINGS

FIGS. 4 (a) and (b) are perspective views of the first base as seen from the front and rear face sides, respectively;

FIGS. 5 (a) and (b) are perspective views of the second base as seen from the front and rear face sides, respectively;

DESCRIPTION OF THE PREFERRED EMBODIMENTS

In the following, preferred embodiments of the inner mirror attachment structure in accordance with the present invention will be explained with reference to the drawings.

Figure 1:
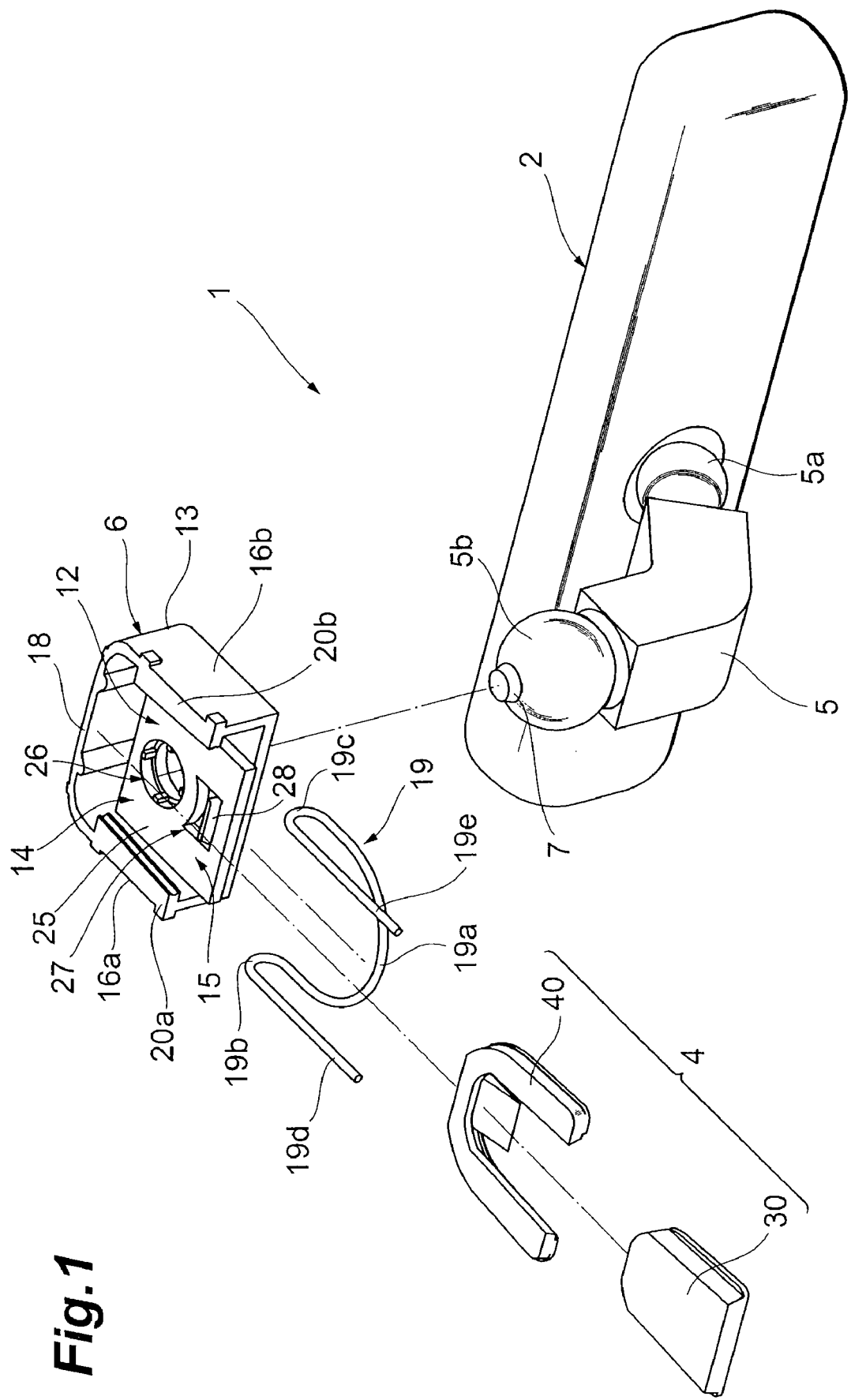
FIG. 1 is an exploded perspective view showing an embodiment of the inner mirror attachment structure in accordance with the present invention.
Figure 2:
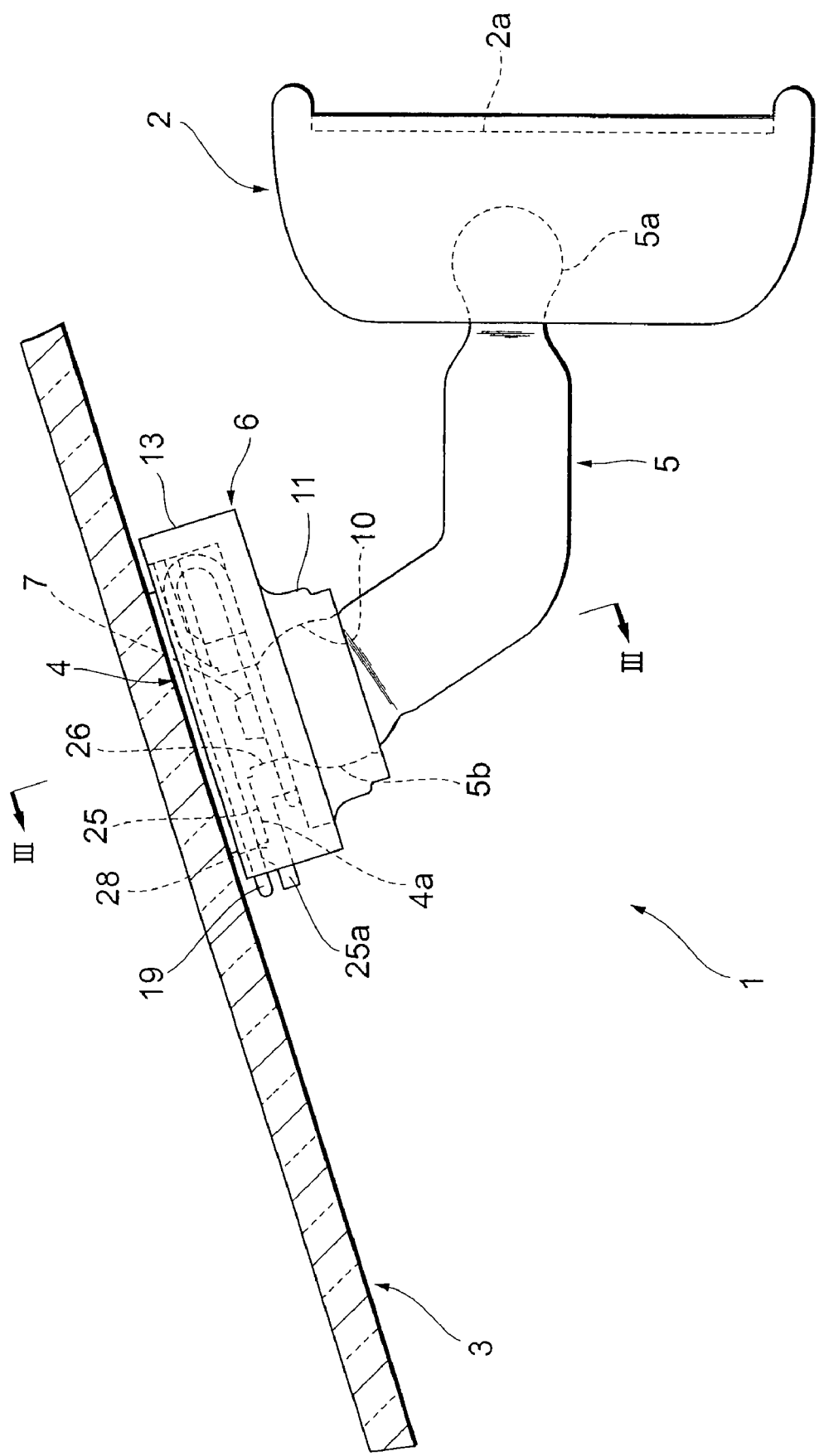
FIG. 2 is a side view of the inner mirror attachment structure shown in FIG. 1.
Figure 3:
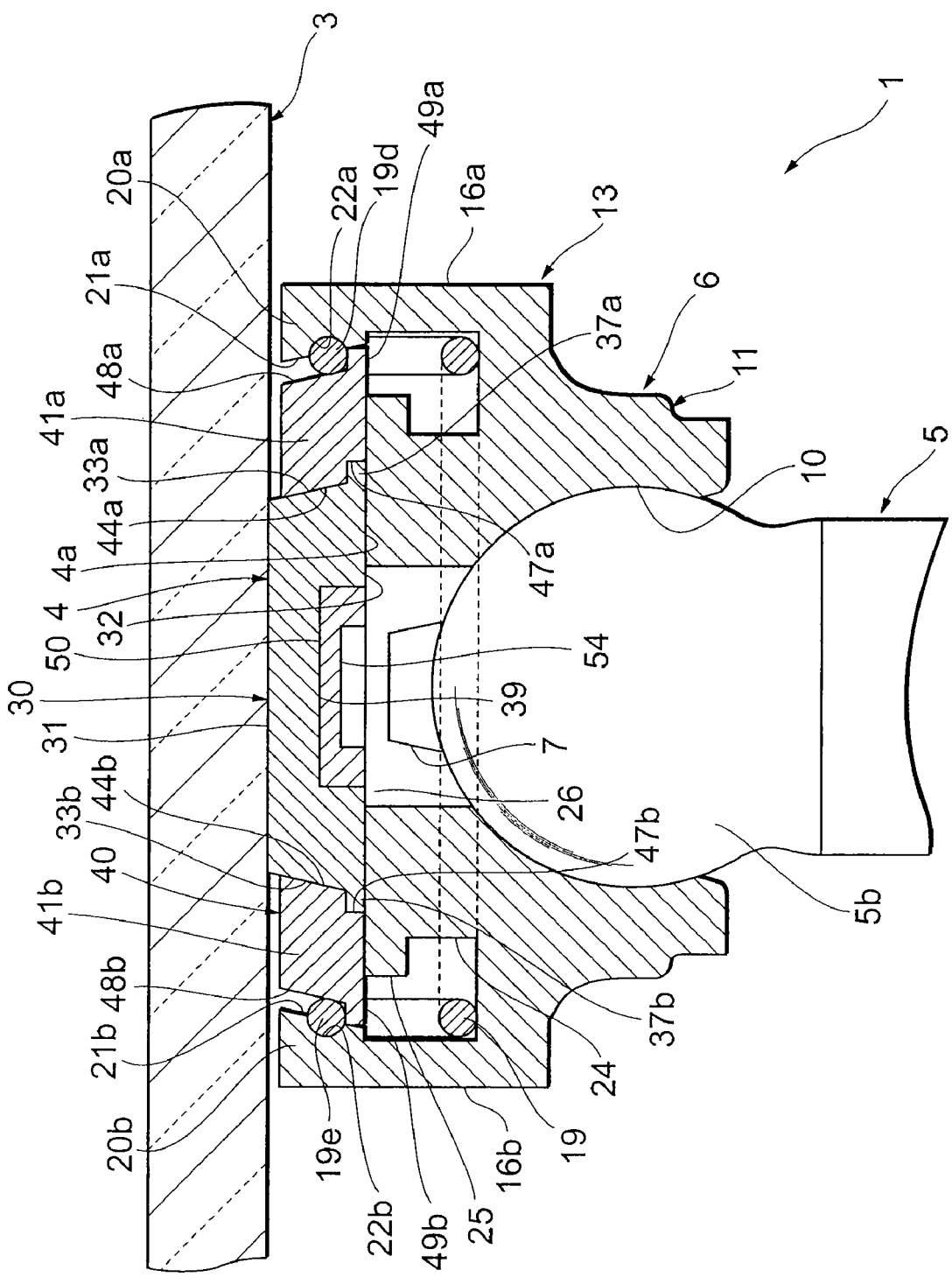
FIG. 3 is a sectional view taken along the line III-III of FIG. 2.

As shown in FIGS. 1 to 3, an inner mirror attachment structure 1 is one by which an inner mirror 2 is attached to a front window 3 through a base 4 bonded to the front window 3.

A mirror 2a for the driver to observe the rear is attached to the front face side of the inner mirror 2. A stay 5 for holding the inner mirror 2 is attached to the back face side of the inner mirror 2. The stay 5 projects from the front window 3 to the interior and has a base part to which a base inner 6 for clasping the base 4 is attached. Both ends of the stay 5 are provided with spherical heads 5a, 5b, respectively. The spherical head 5a and the inner mirror 2 are ball-jointed, so that the inner mirror 2 is tiltably held by the stay 5. Similarly, the spherical head 5b and the base inner 6 are ball-jointed, so that the stay 5 is tiltably held by the base inner 6. The spherical head 5b is provided with a protrusion 7 which projects to the base inner 6. When the stay 5 tilts beyond its typical usage range, the protrusion 7 abuts against the base 4, thereby restraining the stay 5 from tilting further.

The base inner 6 holds the inner mirror 2 through the stay 5 and is held by the base 4. The base inner 6 is provided with a stay holding part 11 and a base clasping part 13. The stay holding part 11 is provided with a spherically recessed surface 10 corresponding to the form of the spherical head 5b of the stay 5, while the base clasping part 13 is formed with a base accommodation space 12 for accommodating the base 4.

The base clasping part 13 is integrated with the stay holding part 11 and substantially formed like a box. The base clasping part 13 is formed with a rear opening 14 which is open to the front window 3, and a lower opening 15 which is open downward. The base clasping part 13 is provided with a pair of opposing side walls 16a, 16b which extend from the stay holding part 11 to the lower opening 15 and form sidewall of the base inner 6. The base clasping part 13 is also provided with an upper end wall 18 which connects the side walls 16a, 16b to each other at a position opposing the lower opening 15.

The upper end parts of the side walls 16a, 16b are provided with clasping parts 20a, 20b which project toward each other and extend along the side walls 16a, 16b, respectively, while the base 4 accommodated in the base accommodation space 12 is clasped by the clasping parts 20a, 20b. The inner end faces 21a, 21b of the clasping parts 20a, 20b are formed as tilted surfaces which reduce the distance therebetween as they approach the front window 3. The inner end faces 21a, 21b of the clasping parts 20a, 20b are provided with spring recesses 22a, 22b which extend along the clasping parts 20a, 20b, respectively. A spring 19 for elastically holding the base 4 is fitted into the spring recesses 22a, 22b.

In the space delimited by the side walls 16a, 16b and the upper end wall 18 within the base inner 6, on the other hand, a cylindrical part 24 projects from the stay holding part 11 to the base accommodation space 12. The upper end of the cylindrical part 24 is provided with a planar base support plate 25 which supports the base 4. The base accommodation space 12 is formed by the base support plate 25, the side walls 16a, 16b, and the upper end wall 18.

The base support plate 25 is arranged such as to be separated from the side walls 16a, 16b and the upper end wall 18, and has a rectangular form. The protrusion 7 of the stay 5 is inserted into a through hole 26 provided in the base support plate 25 and cylindrical part 24. A cutout 27 is formed in the base support plate 25 between the end part 25a on the lower opening 15 side and the through hole 26, whereby the base support plate 25 is easier to flex. A protrusion 28 projecting to the base accommodation space 12 is provided in the base support plate 25 between the cutout 27 and the end part 25a. The base 4 accommodated in the base accommodation space 12 is supported by the protrusion 28 from the lower opening 15 side.

On the other hand, the spring 19 fitted into the spring recesses 22a, 22b is formed by bending a wire rod. The spring 19 is constituted by a U-shaped part 19a abutting against the periphery of the cylindrical part 24 and extending to the vicinity of the upper end wall 18, a pair of base abutting parts 19d, 19e fitted into the spring recesses 22a, 22b of the clasping parts 20a, 20b, and a pair of connecting parts 19b, 19c which connect the U-shaped part 19a to the base abutting parts 19d, 19e, respectively. The spring 19 is inserted into the base inner 6 from the lower opening 15, so that the U-shaped part 19a abuts against the cylindrical part 24, while the base abutting parts 19d, 19e are fitted into spring recesses 22a, 22b, respectively, whereby the spring 19 is mounted to the base inner 6.

The base 4, which is formed from aluminum, is constituted by a first base 30 bonded to the front window 3 and a second base 40 clasped by the base inner 6.

As shown in FIG. 4, the first base 30 is formed like a substantially trapezoidal plate with chamfered corners. The first base 30 has a rear face 31 to be bonded to the front window 3, a front face 32 opposing the rear face 31 and facing the interior, a pair of opposing side faces 33a, 33b which determine the width of the first base 30, a lower end face 35 which is faced down and positioned on the front side in a mating direction S along which the base inner 6 mates with the base 4, and an upper end face 36 which is faced up and positioned on the rear side in the mating direction S. The first base 30 is bonded to the front window 3 with the upper end face 36 facing up.

The side faces 33a, 33b of the first base 30 are tilted such as to extend outward from the rear face 31 to the front face 32. The side faces 33a, 33b are provided with flange parts 37a, 37b (a first flange part) projecting along the front face 32 from the side faces 33a, 33b. The front face 32 of the first base 30 is formed with a guide groove 39 (a first guide groove) extending along the mating direction S from the end part 32a on the upper end face 36 side to the inside (the center of the front face 32). The guide groove 39 is arranged at the center in the width direction of the first base 30, while the groove bottom is formed as a tilted surface which becomes shallower toward the inner side.

As shown in FIG. 5, the second base 40 is formed like an inverted U. The second base 40 is formed slightly thinner than the first base 30, while having a rear face 45 facing the front window 3 and a front face 46 facing the interior which are planes parallel to each other. The second base 40 is provided with a pair of opposing wider parts 41a, 41b (a wall forming a mating part) which extend like arms, and a connecting part 42 which connects the wider parts 41a, 41b to each other in the upper part. A mating part 43 for inserting the first base 30 is formed in an area delimited by the wider parts 41a, 41b and the connecting part 42.

The wider parts 41a, 41b are formed symmetrical to each other about the center axis extending in the mating direction S. The wider parts 41a, 41b abut against and extend outward from the side faces 33a, 33b of the first base 30 inserted into the mating part 43, respectively.

Figure 6:
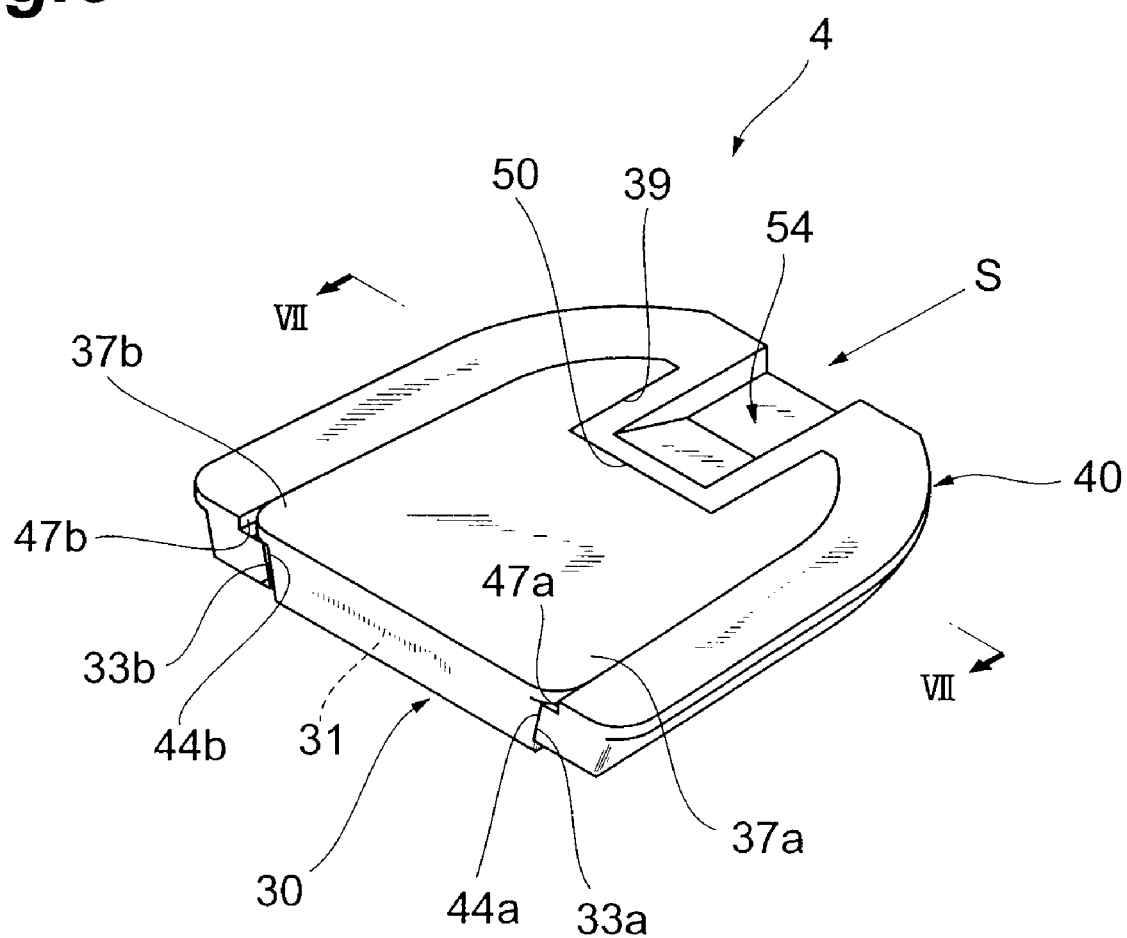
FIG. 6 is a perspective view showing a state where the first base is fitted into the second base.
Figure 7:
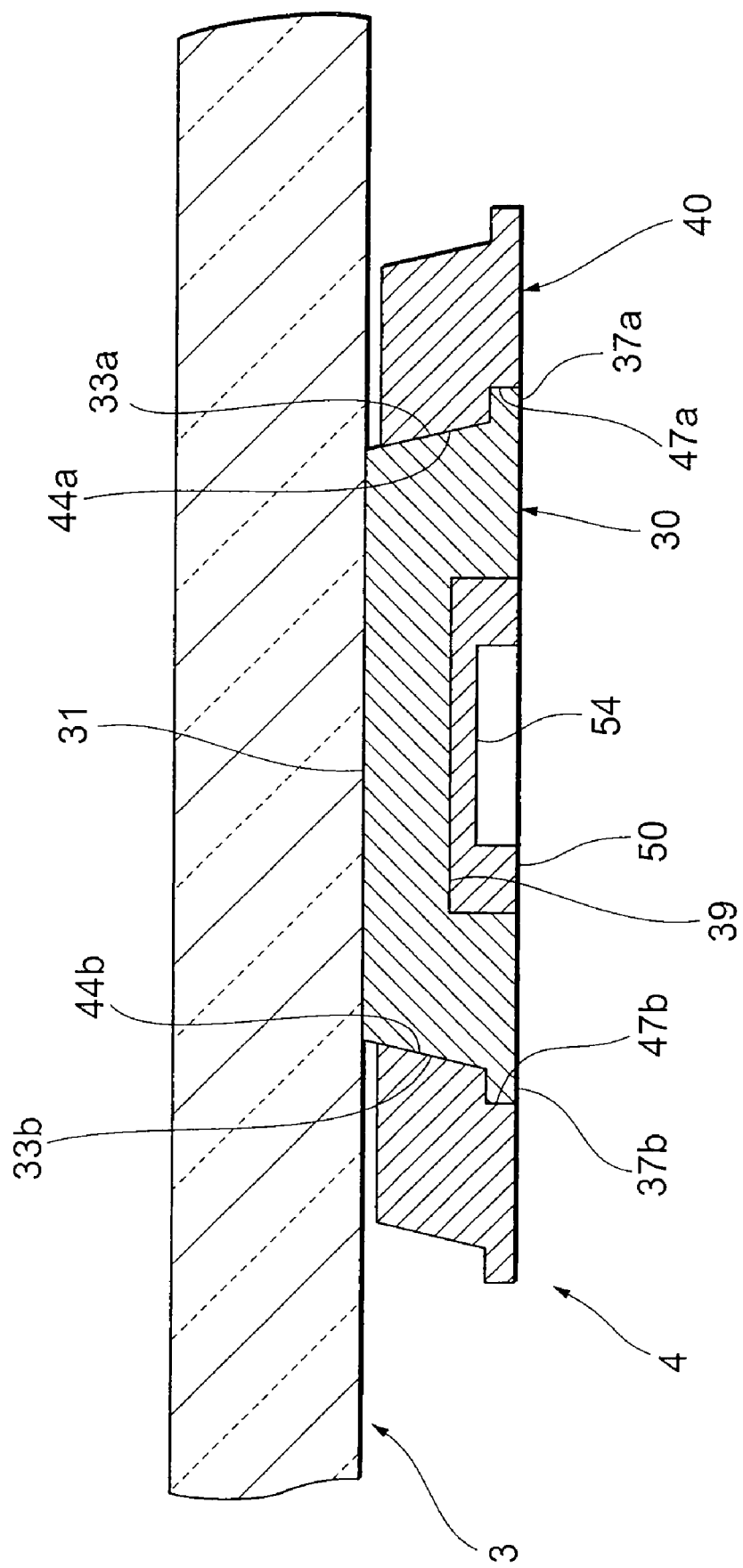
FIG. 7 is a sectional view taken along the line VII-VII of FIG. 6.

When the first base 30 is inserted into the mating part 43 in the second base 40, the first base 30 and the second base 40 are integrated with each other, so as to form the single base 4 as shown in FIGS. 6 and 7. The base inner 6 clasps the wider parts 41a, 41b through the base abutting parts 19d, 19e of the spring 19, so as to be held by the base 4. When the second base 40 equipped with the wider parts 41a, 41b is mated with the first base 30 as such, the clasping width of the base 4 clasped by the base inner 6 can be expanded by the widths of the wider parts 41a, 41b of the second base 40, whereby the force by which the base 4 holds the inner mirror 2 can be improved even when the first base 30 is commoditized. Such an improvement in the holding force can suppress chatter vibrations and the like between the base and the base inner without providing dampers and the like against chatter vibrations.

As shown in FIG. 5, the inner side faces 44a, 44b of the wider parts 41a, 41b abut against the side faces 33a, 33b of the first base 30 and are tilted such as to extend outward from the rear faces 45a, 45b to the front faces 46a, 46b. L-shaped groove parts 47a, 47b (a first groove part) extending along the wider parts 41a, 41b are formed in boundary parts between the inner side faces 44a, 44b and the front faces 46a, 46b, respectively. When the first base 30 is inserted into the mating part 43 of the second base 40, the flange parts 37a, 37b of the first base 30 are fitted into the groove parts 47a, 47b, respectively. The flange parts 37a, 37b thus fitted into the groove parts 47a, 47b abut against the wall faces forming the groove parts 47a, 47b, so as to be restrained from moving away from the front window 3. This can reliably prevent the second base 40 from dropping out of the first base 30.

The groove parts 47a, 47b are formed by the same width as that of the flange parts 37a, 37b. Therefore, when the flanges 37a, 37b are fitted into the groove parts 47a, 47b, the front face 32 of the first base 30 becomes flush with the front faces 46a, 46b of the second base 40, whereby the front face 4a of the base 4 can be formed as a plane without steps. This can bring the front face of the base support plate 25 of the base inner 6 into close contact with the front faces of the first base 30 and second base 40 (see FIG. 3).

As with the inner side faces 44a, 44b, the outer side faces 48a, 48b of the wider parts 41a, 41b are tilted such as to extend outward from the rear faces 45a, 45b to the front faces 46a, 46b. The end parts of the outer side faces 48a, 48b on the side of the front faces 46a, 46b are provided with flange parts 49a, 49b projecting along the front faces 46a, 46b, respectively.

The connecting part 42 of the second base 40 is provided with a tongue 50 fitted into the guide groove 39 of the first base 30. The tongue 50 projects toward center of the mating part 43 from the connecting part 42 and has the same shape as that of the guide groove 39 of the first base 30 in order to fit completely into the guide groove 39. The rear face of the tongue 50 is formed with a tilted surface 51 having the same gradient as that of the groove bottom of the guide groove 39 in the first base 30, while the front face 52 is formed flush with the front face 46 of the second base 40 (the front faces 46a, 46b of the wider parts 41a, 41b). When the tongue 50 is fitted into the guide groove 39 of the first base 30, the tongue 50 abuts against the groove bottom forming the guide groove 39, thereby restraining the second base 40 from moving toward the front window 3. This can keep the gap between the second base 40 and the front window 3, so as to prevent the second base 40 from coming into contact with the front window 3. Since the front face 4a of the base 4 becomes flat, the base support plate 25 of base inner 6 can uniformly support the first base 30 and second base 40.

Since the tongue 50 fits into the guide groove 39 as shown in FIG. 7, the second base 40 is restrained from jolting against the first base 30, and the fastening force between the first base 30 and second base 40 can be improved. Since both of the guide groove 39 and the outer face of the tongue 50 are formed with tilted surfaces, the adhesion between the first base 30 and second base 40 can be improved.

The front face 52 of the tongue 50 is formed with a guide groove 54 (a second guide groove) for guiding the protrusion 28 (see FIG. 1) provided in the base support plate 25. The guide groove 54 is arranged at the center in the width direction of the tongue 50, and extends along the mating direction S from the end part 40a of the second base 40 to the leading end part 53 of the tongue 50. The groove bottom of the guide groove 54 is formed as a tilted surface which becomes shallower toward the leading end part 53 of the tongue 50. When the protrusion 28 is introduced into the guide groove 54, the guide groove 54 guides the protrusion 28, so as to advance the base inner 6 along the guide groove 54. This allows the base inner 6 to smoothly mate with the second base 40, and thus can improve the workability.

Operations for attaching the inner mirror 2 to the front window 3 will now be explained.

First, as shown in FIG. 6, the first base 30 is inserted into the mating part 43 of the second base 40, so that the second base 40 mates with the first base 30 in the mating direction S.

In this case, as shown in FIG. 7, the inner side faces 44a, 44b of the second base 40 abut against the side faces 33a, 33b of the first base 30, and the flange parts 37a, 37b of the first base 30 fit into the groove parts 47a, 47b of the second base 40. The tongue 50 of the second base 40 is inserted into the guide groove 39 of the first base 30. The second base 40 is integrally connected to the first base 30 by holding the first base 30 with the tongue 50 and the walls forming the groove parts 47a, 47b. In this state, the rear face 31 is bonded to the front window 3.

Figure 8:
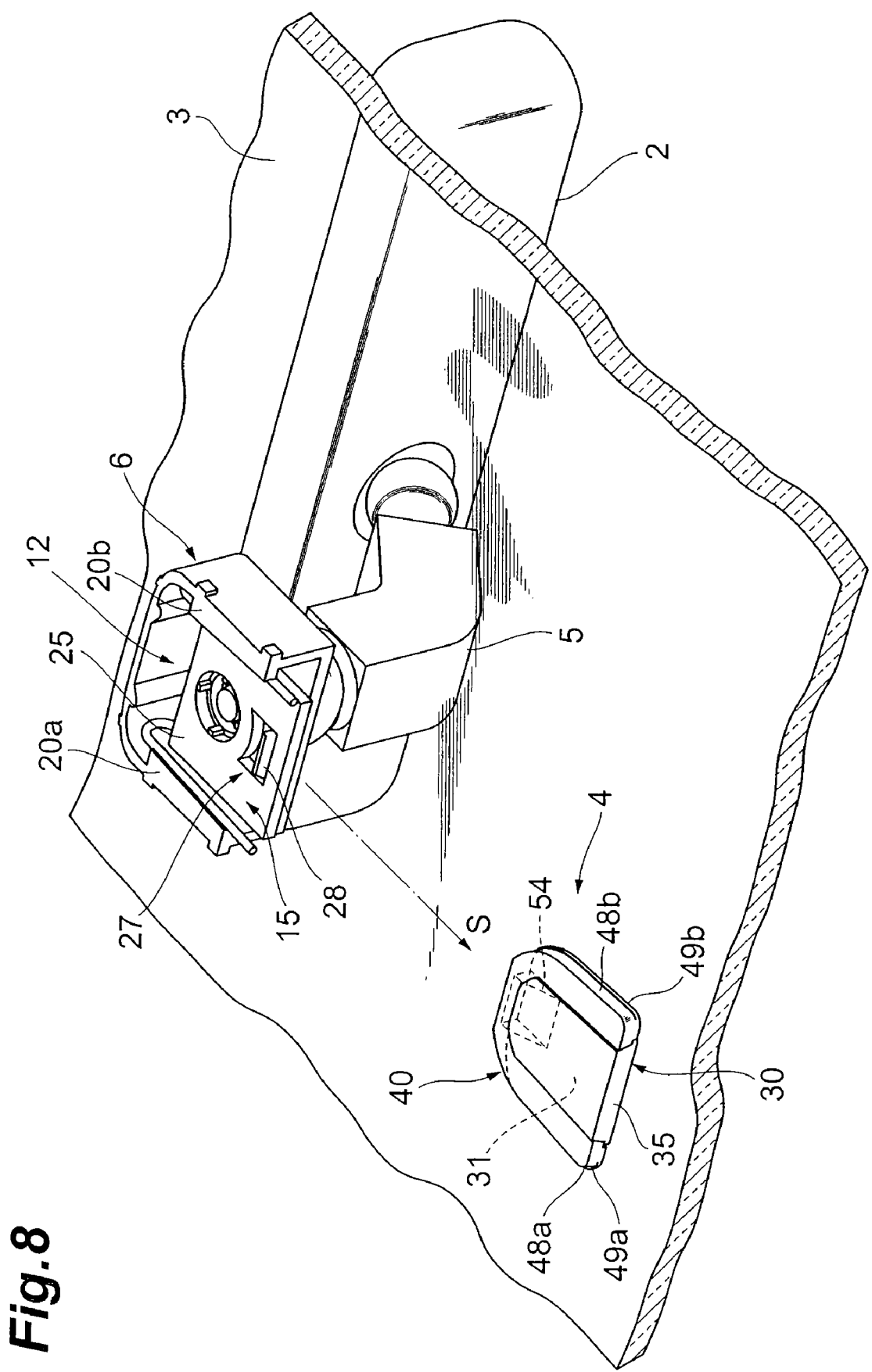
FIG. 8 is a perspective view showing a state before mounting the inner mirror to the base.
Figure 9:
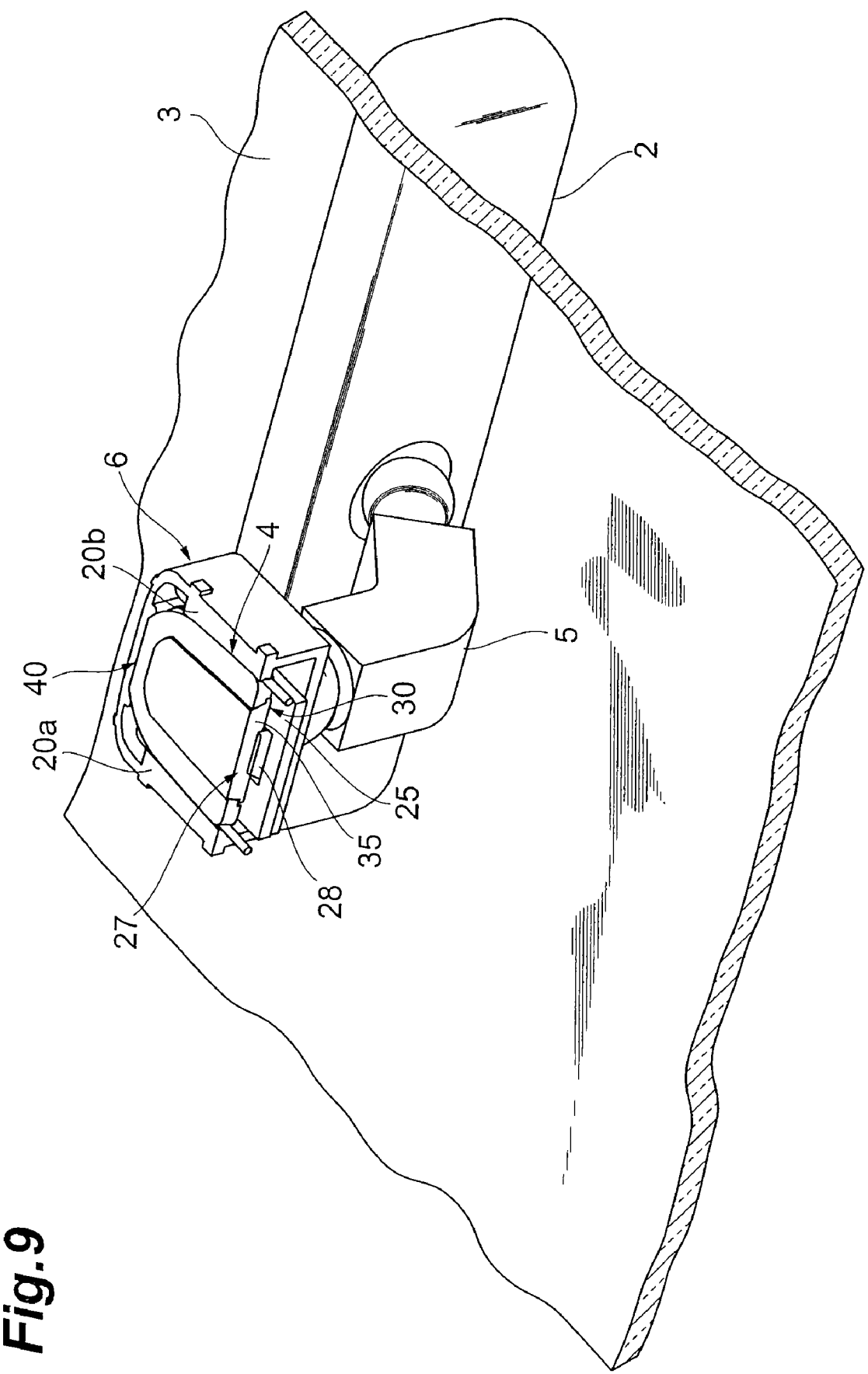
FIG. 9 is a perspective view showing a state after mounting the inner mirror to the base.

Thereafter, along the mating direction S, the base inner 6 having the inner mirror 2 attached thereto is mated with the base 4 in which the first base 30 and second base 40 are integrally connected to each other, so as to insert the base 4 into the base accommodation space 12 in the base inner 6 as shown in FIGS. 8 and 9.

Here, the protrusion 28 of the base support plate 25 is introduced into the guide groove 54 of the second base 40, so as to be guided in the mating direction S. As the base inner 6 advances in the mating direction S, the protrusion 28 is pushed by the groove bottom of the guide groove 54, whereby the base support plate 25 flexes. After the base 4 passes the protrusion 28, the protrusion 28 is pushed back by a restoring force of the base support plate 25, whereby the lower end face 35 of the first base 30 is supported by the protrusion 28. Thus providing the protrusion 28 can prevent the base 4 accommodated in the base accommodation space 12 from dropping out. The base inner 6 can be guided in the mating direction S by providing the guide groove 54 in which the protrusion 28 is introduced when inserting the base 4 into the base accommodation space 12.

When the base 4 is inserted into the base accommodation space 12 of the base inner 6, the clasping parts 20a, 20b of the base inner 6 abut against the outer side faces 48a, 48b and flange parts 49a, 49b of the second base 40 through the base abutting parts 19d, 19e of the spring 19 as shown in FIG. 3. On the other hand, the base support plate 25 of the base inner 6 abuts against the front face 32 of the first base 30 and the front face 46 of the second base 40. The base inner 6 is thus integrally connected to the base 4 by holding the base 4 with the clasping parts 20a, 20b and the base support plate 25 and clasping the outer side faces 48a, 48b of the second base 40. As a consequence, the inner mirror 2 is held by the base 4, so that the inner mirror 2 is attached to the front window 3.

Figure 10:
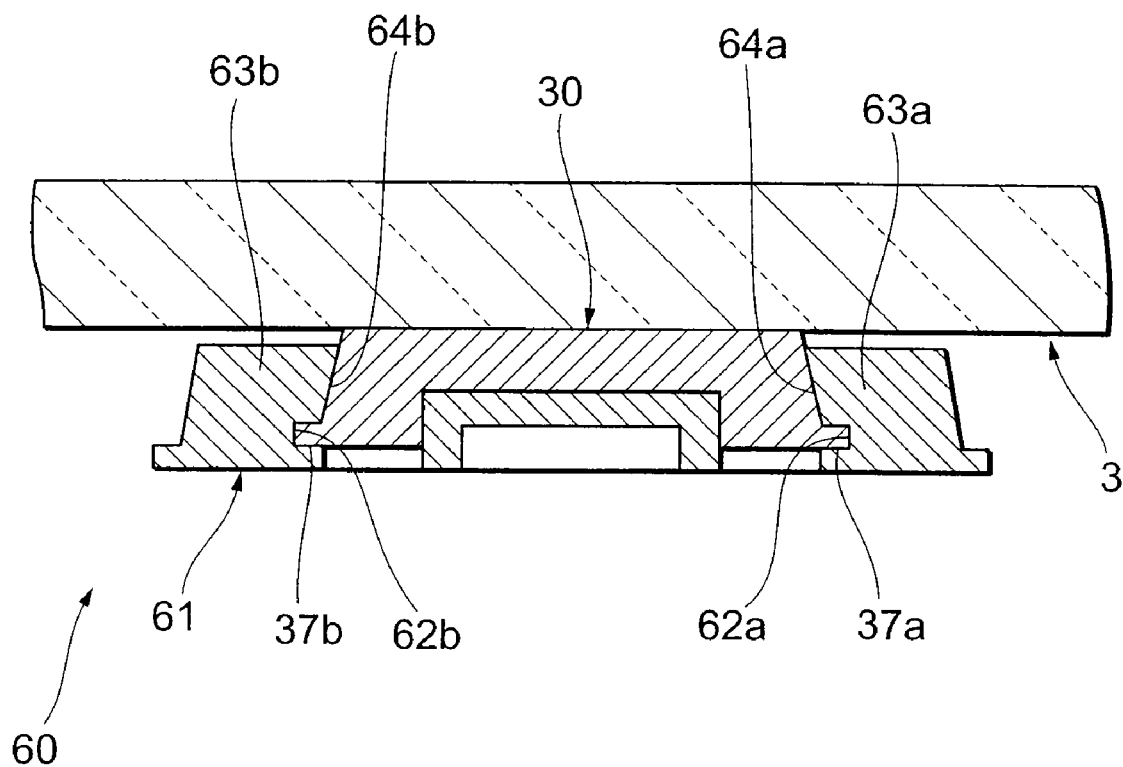
FIG. 10 is a sectional view showing another example of the base.

As shown in FIG. 10, a base 60 in another example has a second base 61 formed by such a thickness as to project from the front face of the first base 30. In wider parts 63a, 63b (a wall forming the mating part) of the second base 61, groove parts 62a, 62b (a first groove part) are provided in the inner side faces 64a, 64b. When the first base 30 is inserted into the second base 61 in thus constructed base 60, the flange parts 37a, 37b of the first base 30 fit into the groove parts 62a, 62b of the second base 61. The flange parts 37a, 37b fitted into the groove parts 62a, 62b are held between a pair of opposing walls forming the groove parts 62a, 62b of the second base 61. Thus providing the groove parts 62a, 62b in the inner side faces 64a, 64b allows the pair of opposing walls forming the groove parts 62a, 62b to hold the flange parts 37a, 37b therebetween. This can further improve the fastening force between the first base 30 and second base 61.

Figure 11:
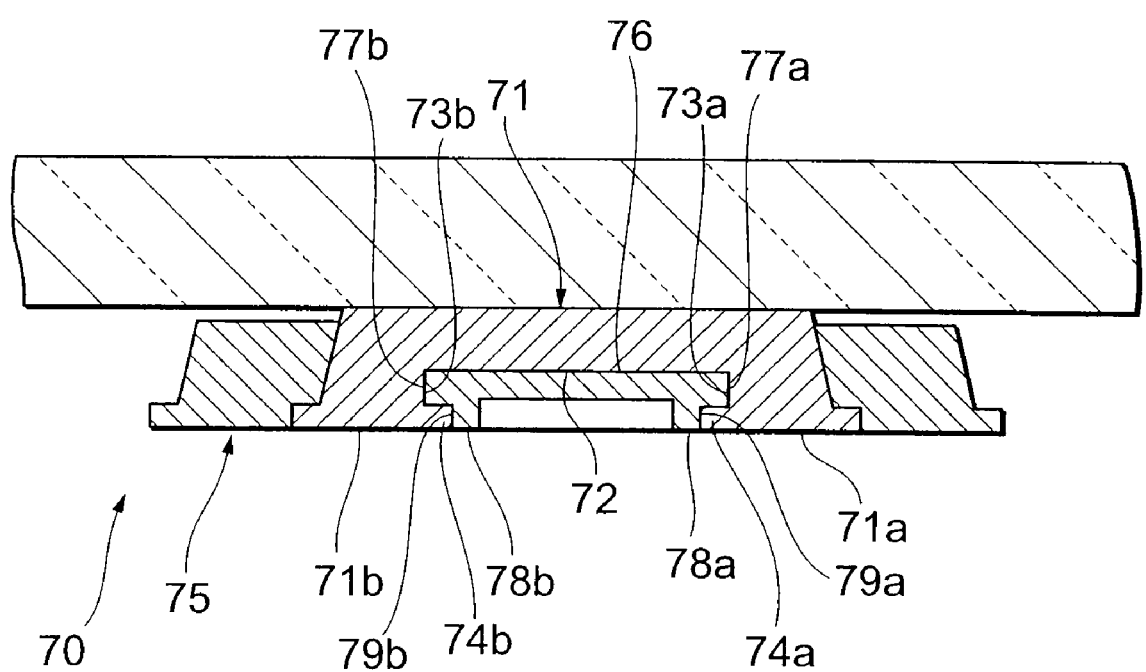
FIG. 11 is a sectional view showing still another example of the base.

As shown in FIG. 11, a base 70 in still another example has a first base 71 provided with flange parts 74a, 74b (a second flange part) projecting along front faces 71a, 71b from wall faces 73a, 73b forming a guide groove 72 (a first guide groove). A tongue 76 of a second base 75 is provided with groove parts 79a, 79b (a second groove part) formed along a front face 78 from side faces 77a, 77b. When the first base 71 is inserted into the second base 75 in thus constructed base 70, the flange parts 74a, 74b of the first base 71 fit into the groove parts 79a, 79b of the tongue 76 in the second base 75. The tongue 76 is held with the groove bottom of the guide groove 72 and the flange parts 74a, 74b. Thus, the tongue 76 is provided with the groove parts 79a, 79b, and the wall faces 73a, 73b forming the guide groove 72 are provided with the flange parts 74a, 74b, whereby the tongue 76 can be held with the groove bottom of the guide groove 72 and the flange parts 74a, 74b. This can further improve the fastening force between the first base 71 and second base 75.

Figure 12:
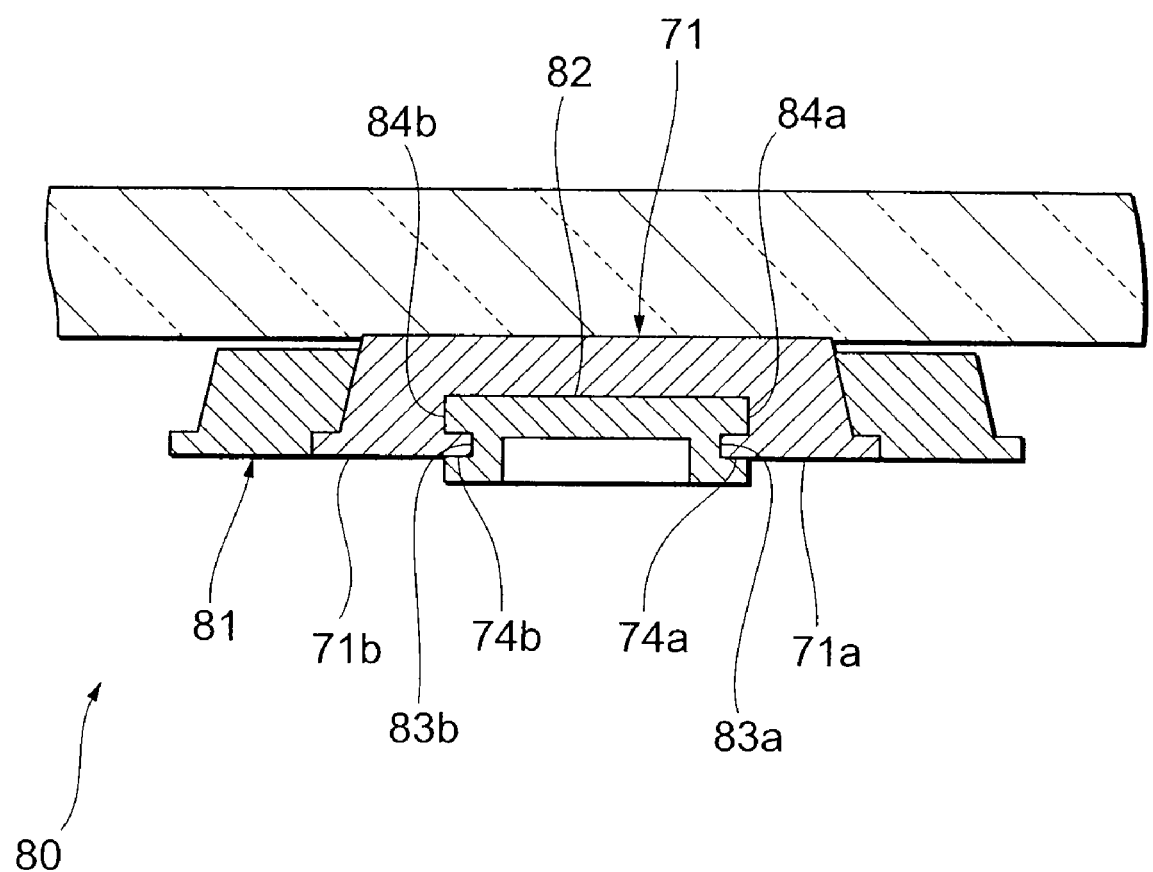
FIG. 12 is a sectional view showing still another example of the base.

As shown in FIG. 12, the base 80 in another example has a second base 81 in which a tongue 82 is formed by such a thickness as to project from the front faces 71a, 71b of the first base 71. In the second base 81, groove parts 83a, 83b (a second groove part) are provided in side faces 84a, 84b of the tongue 82. When the first base 71 is inserted into the second base 81 in thus constructed base 80, the flange parts 74a, 74b of the first base 71 fit into the groove parts 83a, 83b of the tongue 82 in the second base 81. The flange parts 74a, 74b are held by a pair of opposing walls forming the groove parts 83a, 83b of the tongue 82. Thus, the groove parts 83a, 83b formed in the tongue 82 are provided in the side faces 84a, 84b, whereby the pair of opposing walls forming the groove parts 83a, 83b can hold the flange parts 74a, 74b. This can further improve the fastening force between the first base 71 and second base 81.

The present invention is not limited to the above-mentioned embodiment. For example, though the above-mentioned embodiment relates to a clasping structure in which the base inner 6 mates with the base 4 in the mating direction S, any structure can be used as the clasping structure between the base and the base inner. For example, the clasping structure may be one which can detachably mount the base inner to the base in a direction orthogonal to the front window. Even if the clasping structure between the base inner and the base is altered, only the wider part of the second base will be required to change its form, while leaving the first base commoditized, whereby the degree of freedom in designing the clasping structure between the base inner and the base can be increased.

The first base and second base may be formed from materials different from each other. For example, forming the first base to be commoditized and the second base from an inexpensive metal and an expensive metal having a high strength, respectively, can improve the strength of the base, while keeping the cost from rising.

The second base may incorporate a power supply or electrode therein. This makes it possible to feed power to the inner mirror even after bonding the first base to the front window, whereby the range of utilization of the inner mirror can be expanded greatly.

What is claimed is:

1. An inner mirror attachment structure for attaching an inner mirror to a front window of a vehicle, comprising:
   a planar base comprising a first base and a second base, the first base having a rear face configured to be bonded to a front window of a vehicle, the second base having a plurality of wider portions forming a recessed mating portion configured to abut against side faces of the first base such that the first base is fitted in the recessed mating portion; and
   a base inner having a fitting portion configured to be fitted to the wider portions of the second base,
   wherein the wider portions are extending outward from the side faces of the first base and are configured to be fitted with the fitting portion of the base inner.

2. An inner mirror attachment structure according to claim 1, wherein the first base has a first flange portion projecting along a front face from the side faces, and the second base has a wall forming the mating portion formed with a first groove portion configured to be fitted with the first flange portion.

3. An inner mirror attachment structure according to claim 2, wherein the front face of the first base is formed with a first guide groove extending inward from an end portion, the second base has a tongue configured to be fitted into the first guide groove, and the tongue is projecting toward the recessed mating portion.

4. An inner mirror attachment structure according to claim 3, wherein the first base has a second flange portion projecting along the front face from a wall face forming the first guide groove, and a side face of the tongue of the second base is formed with a second groove portion configured to be fitted with the second flange portion.

5. An inner mirror attachment structure according to claim 3, wherein the base inner has a protrusion projecting toward a base accommodation space configured to accommodate the planar base is inserted in the base accommodation space, and a front face of the tongue of the second base is formed with a second guide groove extending along an extending direction of the first guide groove from an end portion such that the protrusion is introduced into the second guide groove when the base is inserted into the base accommodation space.

6. An inner mirror attachment structure according to claim 4, wherein the base inner has a protrusion projecting toward a base accommodation space configured to accommodate the planar base inserted in the base accommodation space, and a front face of the tongue of the second base is formed with a second guide groove extending along an extending direction of the first guide groove from an end portion such that the protrusion is introduced into the second guide groove when the base is inserted into the base accommodation space.

7. An inner mirror attachment structure according to claim 1, wherein the base inner comprises a stay holding portion configured to hold a stay which holds the inner mirror.

8. An inner mirror attachment structure according to claim 1, wherein the fitting portion of the base inner is configured to clasp the wider portions of the second base.

* * * * *